(12) United States Patent
Frimodig et al.

(10) Patent No.: US 6,351,828 B1
(45) Date of Patent: Feb. 26, 2002

(54) SAFETY DEVICE FOR DIAGNOSTIC TERMINALS IN DISTRIBUTED COMPUTER NETWORKS

(75) Inventors: Hans-Ove Frimodig, Göteborg; Anders Lundqvist, Frölunda, both of (SE)

(73) Assignee: Mercel AB (SE)

( * ) Notice: Subject to any disclaimer, the term of this patent is extended or adjusted under 35 U.S.C. 154(b) by 0 days.

(21) Appl. No.: 09/155,387

(22) PCT Filed: Feb. 13, 1998

(86) PCT No.: PCT/SE98/00268
§ 371 Date: Sep. 28, 1998
§ 102(e) Date: Sep. 28, 1998

(87) PCT Pub. No.: WO98/35857
PCT Pub. Date: Aug. 20, 1998

(30) Foreign Application Priority Data

Feb. 17, 1997 (SE) .............................. 9700546

(51) Int. Cl.[7] .............................................. G06F 11/30
(52) U.S. Cl. .......................................... 714/43; 709/201
(58) Field of Search .............................. 714/43, 44, 46, 714/47, 48, 4, 25, 27, 31, 721, 735, 742; 709/201, 203, 217, 250

(56) References Cited

U.S. PATENT DOCUMENTS

| 4,257,101 A | * | 3/1981 | Holtey et al. ............ 364/200 |
| 4,670,834 A | * | 6/1987 | Byal et al. ................ 364/186 |
| 4,748,843 A | | 6/1988 | Schafer et al. ............. 73/117.3 |
| 4,918,690 A | * | 4/1990 | Markkula, Jr. et al. ....... 370/94 |
| 5,550,736 A | * | 8/1996 | Hay et al. ............... 364/424.03 |
| 5,659,555 A | * | 8/1997 | Lee et al. .................. 371/27.1 |
| 5,737,364 A | * | 4/1998 | Cohen et al. ............... 375/220 |
| 5,909,464 A | * | 6/1999 | Cohen et al. ............... 375/220 |
| 5,970,430 A | * | 10/1999 | Burns et al. ................ 702/122 |
| 6,085,244 A | * | 7/2000 | Wookey ..................... 709/224 |

FOREIGN PATENT DOCUMENTS

| DE | 4110372 | 10/1991 |
| EP | 0493980 | 7/1992 |
| EP | 0718156 | 6/1996 |
| WO | 9706514 | 2/1997 |

* cited by examiner

Primary Examiner—Nadeem Iqbal
(74) Attorney, Agent, or Firm—Ostrolenk, Faber, Gerb & Soffen, LLP

(57) ABSTRACT

A safety device for diagnostic terminals (3) in distributed computer networks (8) containing at least two nodes and a common communication bus (10a, 10b) for the computer network, preferably implemented in vehicles. The diagnostic terminal enables connection of an external diagnostic equipment (1) to different nodes (20a, 20b, 20c) within the computer network. By a signal evaluation circuit (12) arranged in the computer network a detection of the signal state at the contact pin or pins (3a, 3b) in the diagnostic terminal can be made, which contact pins connect the diagnostic equipment to the communication bus. A predetermined signal state will indicate an authorized connection of a diagnostic equipment (1), and only after an authorized connection will a direct connection to the communication bus (10a, 10b) be established via a relay function (13, 14a, 14b).

8 Claims, 2 Drawing Sheets

SAFETY DEVICE FOR DIAGNOSTIC TERMINALS IN DISTRIBUTED COMPUTER NETWORKS

BACKGROUND OF THE INVENTION

The present invention relates to a safety device for diagnostic terminals in distributed computer networks, preferably implemented in vehicles, which diagnostic terminal enable direct access to communication busses transmitting information between distributed nodes within the computer network during operation thereof.

Vehicles are nowadays more frequently equipped with distributed computer networks with numerous nodes monitoring different functions in the vehicle and communication between all nodes is obtained using a common communication bus. The communication is preferably implemented in digital form with messages transmitted serially on the communication bus. Each message contain an address, also designated as an identifier, and data to be transmitted to each respective node or nodes having the dedicated address. In certain type of general messages the address could be missing.

With the purpose of performing a diagnostic routine of essential functions and collecting any fault messages stored in the nodes, an external diagnostic may be connected equipment to the system arranged in the vehicle. The diagnostic equipment could in that respect include an interface having a communication protocol being compatible with the communication bus which will enable transmission and reception of messages on the communication bus arranged in the vehicle. In order to obtain a thorough diagnosis an activation of node functions, using the communication bus, may be needed In order to be able to connect the diagnostic equipment to the communication bus a diagnostic terminal in the vehicle is needed, the terminal establishing connection at least to the communication bus and preferably also to other systems in the vehicle. This diagnostic terminal is conventionally realised by a multi-contact plug, where a limited number of contact pins of the multi-contact plug is connectable to the communication bus. Remaining contact pins are used for monitoring or controlling purposes of other functions within the vehicle, which are not controlled or managed by the nodes connected to the communication bus.

In certain type of vehicle systems dedicated nodes have been implemented, i.e. Gateway-nodes, which nodes connects the diagnostic terminal to the communication link. This kind of Gateway-nodes often includes functions being able to convert data from the diagnostic equipment according to a specific communication protocol used by the diagnostic equipment and to the communication protocol of the communication bus, and vice versa. Some restrictions in form or type of data to be transmitted between the diagnostic equipment and the nodes arranged in the vehicle is often obtained by such Gateway-nodes.

In order to avoid these expensive Gateway-nodes the diagnostic equipment could instead be connected directly to the communication bus in the vehicle. With the purpose to reduce introduction of disturbances to the communication bus it has been proposed to use a dedicated contact pin in the multi-pin plug as an activator which selectively could unlock a direct access to the communication bus. This will require an increase of contact pins in the diagnostic terminal, which results in an increase of cost and an additional potential source for error.

SUMMARY OF THE INVENTION

The object of the invention is to prevent short-circuiting of the communication bus used in distributed computer networks, if contact pins in a diagnostic terminal connected to the communication bus should be short circuited. The invention will also prevent misapplication of voltages and other disturbances on the communication bus via the diagnostic terminal. Short-circuiting, incorrect voltages or other disturbances applied on the communication bus could during operation of the vehicle result in essential functions ceasing to operate, which as an example could lead to the engine being shut down.

Another object is to reduce the number of required contact pins in the diagnostic terminal Yet another object is to obtain a protection against unauthorised access via the diagnostic terminal to the communication bus in distributed computer networks.

By the inventive safety device an improved protection against unauthorised access via the diagnostic terminal to the communication bus may obtained, and at the same time the number of contact pins in the diagnostic terminal may reduced, which will improve the reliability of the distributed computer network and reduce potential sources for error during operation of the computer network or during initiation of a diagnostic routine.

Other distinguishing features and advantages of the invention are evident from the following description of preferred embodiments. Which are made by reference to the drawings.

DETAILED DESCRIPTION OF PREFERRED EMBODIMENTS

Figure 1:
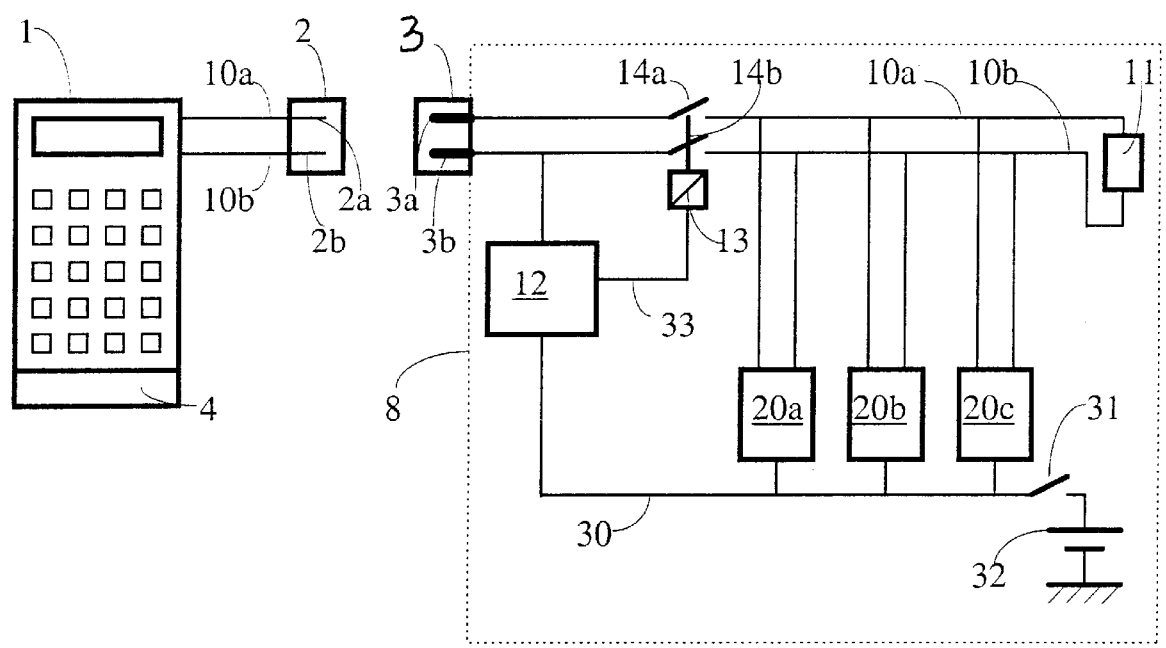
FIG. 1 shows schematically a distributed computer network, and an external diagnostic equipment connectable to the computer network via a diagnostic terminal.

In FIG. 1 is shown schematically a distributed computer network 8, preferably implemented in a vehicle, which computer network includes a plurality of nodes 20a–20c using a common communication bus 10a,10b for communication.

In an implementation in motor vehicles the nodes 20a–20c could correspond to a gearbox node, an ignition system node, a fuel system node or a brake system node, the latter preferably the ABS-system for the vehicle (ABS=Anti Blocking System for brakes).

The communication on the communication bus 10a,10b is executed serially and in digital form according to a defined communication protocol. Preferably a CAN-protocol (CAN=Controller Area Network) corresponding to the standard ISO 11898:1993 is used, which protocol supports real time control and multiplex transmission. Also other similar type of communication protocols could be used, such as SAE J 1850, or other protocols compatible with ISO 11519.

The communication bus 10a,10b is implemented as a differentiated dual wire according to the standard ISO 11898:1993 (see section 10.5). This type of differentiated dual wire includes a terminating resistor 11 between the dual wires 10a10b. Differentiated dual wires are used in order to reduce sensitivity for noise/disturbances. In the initial state both wires in the differentiated dual wire are set at a substantially similar voltage level, and during transition to a dominant state, conventionally representing a logic "0", the potential of one wire is reduced while the potential of the other wire is increased. Any external disturbances affects both wires in a similar manner, and could thus not affect the present logical representation on the communication bus.

Transmission rates up to a couple of hundred kbit per second could be used, and the transmission rate used is dictated by the response requirements on the system.

The power supply in the vehicle is obtained from a battery 32, which battery supplies power to the nodes via the ignition switch 31 and a power supply bus 30.

Figure 5:
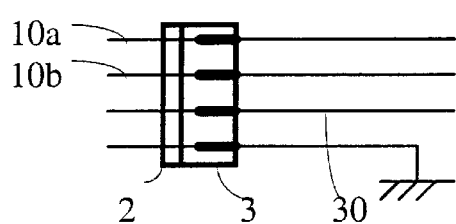
FIG. 5 shows an embodiment where the power supply to the diagnostic equipment is obtained via the diagnostic terminal.

In order to enable a proper diagnosis of the computer network 8 and the nodes thereof a diagnostic terminal 3 is available, having a first set of contact pins 3a,3b connectable to each wire in the communication bus 10a,10b. For the diagnostic routine an external diagnostic equipment is required, i.e. a diagnostic unit 1, having a diagnostic connector 2 including a second set of contact pins 3a, 3b 2a,2b compatible with the first set of contact pins. When the diagnostic connector 2 is connected to the diagnostic terminal 3, are the first and second sets of contact pins are connected, i.e. 2a with 3a and 2b with 3b. The diagnostic equipment 1 could have an integrated power supply 4, but could also in a conventional manner obtain power supply through dedicated contact pins in the diagnostic connector 2 and the diagnostic terminal 3, which will connect to power supply bus 30 within the vehicle, as shown in FIG. 5.

The diagnostic connector 2 and terminal 3 preferably includes a number of contact pins for a plurality of other functions within the vehicle. In a conventional manner a plurality of contact pins are gathered in one and the same connector/terminal, and up to an additional 20 contact pins besides the contact pins for the communication bus could exist. However, in FIG. 1 only the contact pins 2a, 2b and 3a, 3b for the communication bus 10a, 10b are shown.

Figure 2:
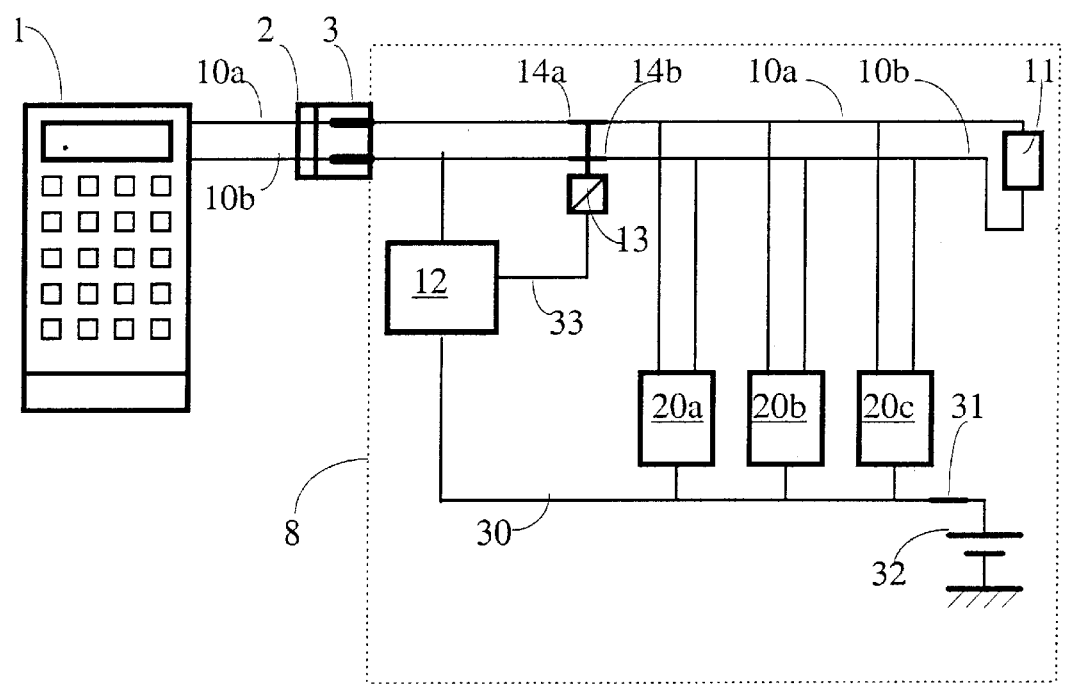
FIG. 2 corresponds to FIG. 1, but with the diagnostic equipment connected to the communication bus in the computer network.

In FIG. 2 the distributed computer network 8 is shown, with an external diagnostic equipment 1 fully connected with direct access to the communication bus 1a, 1b in the computer network 8, via relay switches 14a, 14b which are controlled by a relay 13. The relay 13 is controlled by a signal evaluation circuit 12, the signal evaluating circuit being able to detect the signal state on at least one of the contact pins 3a or 3b of the diagnostic terminal 3. When a predetermined signal state is present at the contact pin, then the signal evaluating circuit is capable of activating the relay 13 in order to close the contacts 14a, 14b. The signal evaluation circuit 12 20a–20c connected to the power supply 32 via the power supply bus 30 when the ignition switch 31 is closed.

Figure 3:
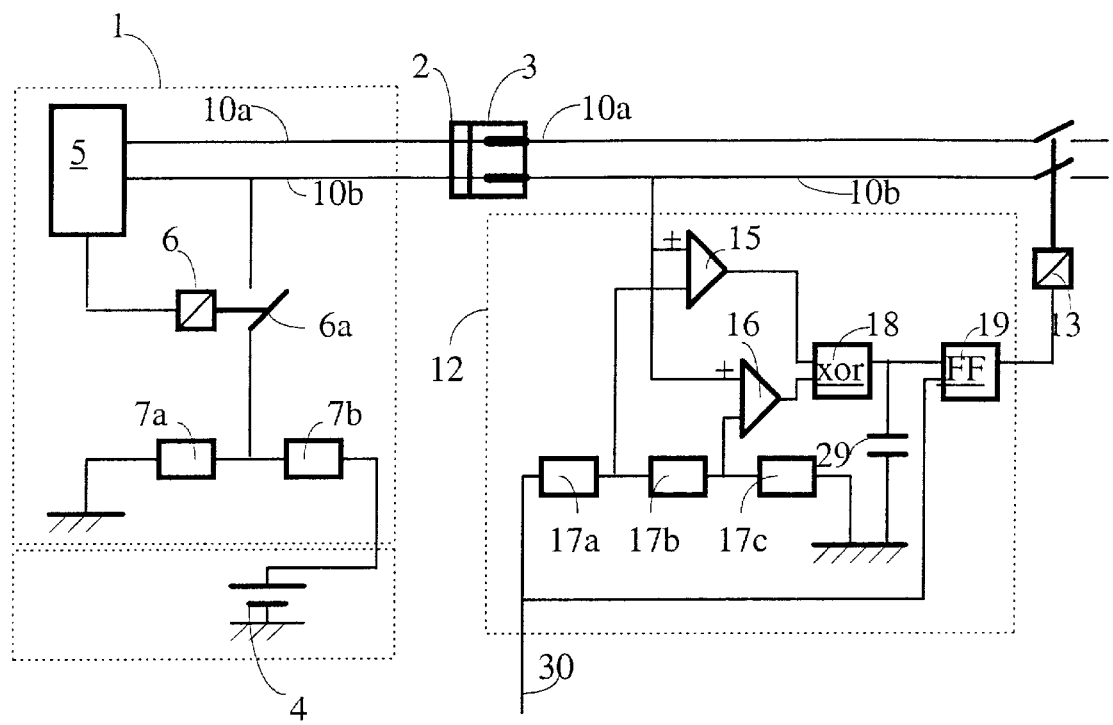
FIG. 3 shows a first embodiment of circuit, by which a direct access to the communication bus could be obtained.

In FIG. 3 is shown a first embodiment of a fundamental design of the signal evaluation circuit 12 and the signal transmitting circuits needed in the diagnostic equipment, in order to control the signal evaluation circuit 12 such that the relay 13 could be activated and close the relay contacts 14a, 14b.

In this embodiment an interface 5 for the communication bus is integrated with the diagnostic equipment, which interface also has the capability of activating a relay 6, or any compatible switching device of a semiconductor design. When the relay 6 closes the relay contact 6a a specific voltage is applied on one of the wires, in FIG. 3, wire 10b, of the communication bus. The relay could preferably be activated by the interface 5 with a short pulse having a duration within the range from a couple of microseconds up to some tens of milliseconds.

By voltage division using resistors 7a, 7b is obtained a voltage pulse is obtained adapted to the communication bus 10a,10b. This voltage pulse is preferably adapted in such a manner that the pulse is unique and different in relation to any normal communication on the communication bus. As an example $CAN_H$ (in FIG. 3 corresponding to 10b) in a differentiated communication bus could be specified to a voltage up to 7.0 volts, and where correct messages never contain more than 8 consecutive bits having the same logical representation. The technique used in order to restrict the number of consecutive bits having the same logical representation is designated as "bit-stuffing" technique, and is implemented by each sending node before a message is to be sent on the communication bus. The initiating pulse activating the relay could therefore be given a potential in the order of 8.0 volts and with a pulse duration exceeding that of 9 bits, and preferably a duration within the range 10–15 bits. Nodes being connected to the communication bus could thus detect a faulty message, and would as a consequence not be affected if the initiating pulse should be sent on the communication bus.

The signal evaluation circuit 12 being able to detect the specific initiating pulse includes two comparators 15 and 16, each obtaining an individual reference voltage via the voltage dividing net 17a–17b–17c. The first reference voltage is obtained between resistors 17a and 17b and could preferably correspond to a voltage level of 8.5 volts. The comparator 15 will thus as a consequence supply an output signal if the voltage level exceeds 8.5 volts.

The second reference voltage is obtained between resistors 17b and 17c and could preferably correspond to a voltage level of 7.5 volts. The comparator 16 will thus as a consequence supply an output signal if the voltage level exceeds 7.5 volts.

The outputs from both comparators 15 and 16 respectively are connected to inputs on a XOR-circuit (XOR; Exclusive OR), 18, resulting in the XOR-circuit issuing an output when only one(1) of the inputs of the XOR-circuit, i.e. one of the outputs from comparators 15 and 16, is in an active output state.

The reference voltages for the comparators selected above in the example, are selected for an initiating pulse having a potential at 8 volts. If any other voltage level is selected each reference voltage should also be modified in a similar manner.

The state of the XOR-circuit, dependent on the voltage level U 10b on the wire U 10b of the communication bus and with an initiating pulse at a voltage level of 8 volts, as well as reference voltages according to the example above, is shown in the following state diagram;

| Output, comparator 15 | Output, comparator 16 | Output XOR | Comments |
|---|---|---|---|
| 0 | 0 | 0 | $U_{10b} < 7.5$ volts |
| 1 | 1 | 0 | $U_{10b} > 8.5$ volts |
| 0 | 1 | 1 | 7.5 volts $\leq U_{10b} \leq$ 8.5 volts |

In order to obtain a functionality where an initiating pulse of short duration could activate the relay 13, and maintain the relay closed until power via power supply bus 30 interrupted, a monostable flip-flop 19 is used. One input of the flip-flop 19 is connected to the output of the XOR-circuit, and the other input is connected to power supply bus 30 via an inverter (not shown).

The output from the flip-flop 19. $UT_{19}$, is shown in the following state diagram:

| $\overline{U_{30}}$ | XOR | $UT_{19}$ | Comments |
|---|---|---|---|
| 0 | 1 | 1 | ignition switch activated and initiating pulse activates relay 13 |
| 1 | 0 | 0 | ignition switch deactivated & without initiating pulse |
| 0 | 0 | 1/0 | maintain |
| 1 | 1 | — | Not defined state* |

*= Without ignition switch activated initiating pulse could not activate relay.

The functionality obtained is that the ignition switch 31 (FIG. 1) must connect the computer network 8 to the power supply 32, and consequently also the signal evaluation circuit 12, and that an initiating pulse issued after connection to the power supply 32 would activate the relay 13 and thus close the contacts 14a, 14b. The relay 13 will be kept in an activated state, i.e. with contacts closed, as long as the computer network 8 is connected to the power supply 32 via the power supply bus 30 and the ignition switch 30 and if an initiating pulse has been issued. As soon as the ignition switch 31 disconnects the power supply 32 the relay 13 will be deactivated. In order to stabilise the circuit such that disturbances, i.e. voltage spikes etc. at wire 10b, would not activate the relay 13, a capacitor could be connected to the output of the XOR-circuit 18.

The embodiment of the circuitry shown in FIG. 3 is only one solution out of many conceivable embodiments. In another embodiment the XOR-circuit could be replaced by an AND-circuit, with the inputs of the comparator 15 switched such that the reference voltage obtained between resistors 17a–17b could instead be connected to the +input of the comparator. In yet another embodiment could the comparators 15 and 16 be replaced by a compatible IC-circuit, for example LM319 (Dual voltage comparator), or LM339 (Quad voltage comparator), manufactured by Philips.

Figure 4:
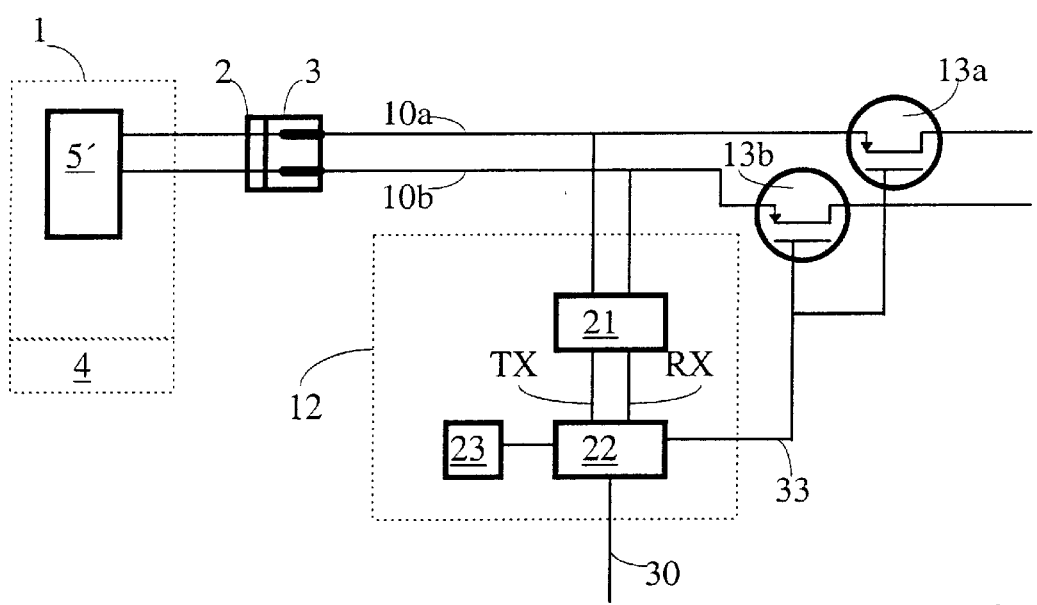
FIG. 4 shows a second embodiment of circuit, by which a direct access to the communication bus could be obtained

In FIG. 4 is shown a second embodiment of a fundamental design of the signal evaluation circuit 12, and the signal transmitting circuits of the diagnostic equipment needed to control the signal evaluation circuit 12, obtaining a compatible relay function using semiconductor devices. In this embodiment is only a conventional interface 5' for the communication bus used in the diagnostic equipment. As an initiating pulse is used a specific message for activation, which specific activation message is given an unique configuration different from any normal message. Such a message could as an example have at least 10–15 consecutive bits with identical digital representation, i.e. without application of the "bit-stuffing" technique on the message. This message could hereby be detected by the nodes as a "faulty" message and could as a consequence not affect the functionality of the nodes.

The signal evaluation circuit 12 includes a conventional CAN-interface, 21, for a differentiated dual wire, and as an example realised by a circuit corresponding to "Philips 82 C250". In a customised IC-circuit 22 could detection of an initiating message be made, and initiating messages could be stored in a non-volatile memory 23. When the circuit 22 detects that the initiating message transmitted on the communication bus matches the initiating message stored in the memory 23, then the output 33 is activated and the semiconductor switches 13b and 13c set to a closed condition.

It is important in both embodiments shown in FIG. 3 and 4 that the relay functions 13,14a, 14b and 13c, 13b respectively, or any compatible relay-function, offer a low-resistant connection between the diagnostic equipment 1 and the communication bus. The relay function could be realised by mechanical relays or analogue relays in a semiconductor design, which do not affect the normal communication to any significant extent.

According the invention shall the evaluation function 12 be integrated in the distributed computer network, and preferably integrated in the diagnostic terminal as such, forming one single unit.

With the embodiment shown in FIG. 4 could a sophisticated authorisation code constitute the initiating message. Such an implementation will offer an improved protection against unauthorised access to the communication bus, in comparison with the embodiment shown in FIG. 3 only demanding a specific voltage level applied on either of the wires 10a,10b.

The embodiment shown in FIG. 3 could however improve authorised access control by implementation of a signal evaluation circuit capable of detection of a predetermined sequential pulse train. Such a pulse train, generated by the diagnostic equipment, could by way of example be formed by a number of pulses at the required voltage level, and having a predetermined duration of each individual pulse, and where each pulse is separated by a time gap having a predetermined duration.

The authorisation code could for different configuration of computer networks or car models be unique for each node configuration in the computer network. The diagnostic equipment could have several authorisation codes stored, and during establishment of connection could authorisation codes be tested until communication is established. The authorisation code used for successful connection of communication could then be used as identifier for the configuration of the computer network, and a diagnostic routine adapted for the computer network could be launched automatically.

The authorisation code(i.e. the initiating message) could preferably be initiated manually by activation of a function- or start button on the diagnostic equipment. Alternatively could the authorisation code be sent automatically when mechanical contacts or sensors in the connector 2 detects a physical connection of the connector 2 with the terminal 3.

In yet another embodiment(not shown) could the evaluation circuit 12 be modified such that the evaluation circuit is able to transmit as well as receive messages on the communication bus. In order to improve authorisation access control further, could a verification of a correct diagnostic equipment be implemented in steps, exchanging messages between the diagnostic equipment and the evaluation circuit 12.

The invention could also be implemented in distributed computer networks having nodes 20a–20c continuously connected to power supply 32. In such a configuration could the relay 13 be deactivated using an unique deactivation message. This deactivation message could be initiated by the nodes in the distributed computer network or by the diagnostic equipment autonomously.

In the embodiments shown in FIGS. 3 and 4 are not shown any details as of signal conditioning components, which by way of example transforms the battery voltage to a supply voltage compatible with the signal/logical level of individual components in the logic. In the embodiments shown is assumed that the battery-/system voltage corresponds to a logical representation of a "1", and a "no voltage" condition corresponds to a logical representation of a "0", if not an inverting function is implemented which would reverse the logical representation.

The invention is not limited to the embodiments shown, and could be modified within the scope of the invention as defined by enclosed claims.

The embodiment shown in FIG. 4 with a detection of the authorisation code by software control, could alternatively be replaced by a hardware masking procedure, designed in hardware and thus not needing any non-volatile memory. In the embodiment shown in FIG. 4 could the authorisation code be altered by changing the authorisation code stored in the memory 23, which memory means conventionally is denoted as a software-masking procedure when used to detect messages sent on the communication bus.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A safety device for a diagnostic terminal for a distributed computer network containing at least two nodes and a common communication bus for the computer network, which diagnostic terminal includes a first set of contact pins for access to the communication bus and is connectable to an external diagnostic equipment for performing diagnostics on the nodes within the computer network, the safety device comprising:

switches which, in a first stable position, connect the first set of contact pins to the communication bus and, in a second stable position, disconnect the first set of contacts from the communication bus; and a signal evaluation circuit connected to the first set of contact pins and arranged to enable detection of a predetermined signal state from the diagnostic equipment at the first set of contact pins and, when a predetermined signal state occurs, causes the switches to switch from the second stable position to the first stable position to connect the first set of contact pins to the communication bus, so that the diagnostic equipment connected to the diagnostic terminal may obtain direct access to the communication bus, the diagnostic equipment applying the predetermined signal state to a second set of contact pins connected with said first set of contact pins when the diagnostic equipment is connected to the diagnostic terminal and the signal evaluation circuit including a detection device which, dependent on a specific voltage level within a predetermined voltage range applied on at least one of the first set of contact pins, will activate the switches and at least two comparators each comparing the voltage applied on at least one of the first set of contact pins with first and second reference voltages, respectively, which first and second reference voltages are obtained from a voltage divider.

2. A safety device for a diagnostic terminal for a distributed computer network containing at least two nodes and a common communication bus for the computer network, which diagnostic terminal includes a first set of contact pins for access to the communication bus and is connectable to an external diagnostic equipment for performing diagnostics on the nodes within the computer network, the safety device comprising:

switches which, in a first stable position, connect the first set of contact pins to the communication bus and, in a second stable position, disconnect the first set of contacts from the communication bus switches; and a signal evaluation circuit connected to the first set of contact pins and arranged to enable detection of a predetermined signal state from the diagnostic equipment at the first set of contact pins and, when a predetermined signal state occurs, causes the switches to switch from the second stable position to the first stable position to connect the first set of contact pins to the communication bus, so that the diagnostic equipment connected to the diagnostic terminal may obtain direct access to the communication bus, the signal evaluation circuit including a detection device which, dependent on a specific voltage level within a predetermined voltage range applied on at least one of the first set of contact pins, will activate the switches and at least two comparators each comparing the voltage applied on at least one of the first set of contact pins with first and second reference voltages, respectively, which first and second reference voltages are obtained from a voltage divider, the switches being relay contacts which are switched by a relay activated by the signal evaluation circuit.

3. A safety device for a diagnostic terminal for a distributed computer network containing at least two nodes and a common communication bus for the computer network, which diagnostic terminal includes a first set of contact pins for access to the communication bus and is connectable to an external diagnostic equipment for performing diagnostics on the nodes within the computer network, the safety device comprising:

semiconductor switches which, in a first stable position, connect the first set of contact pins to the communication bus and, in a second stable position, disconnect the first set of contacts from the communication bus; and a signal evaluation circuit connected to the first set of contact pins and arranged to enable detection of a predetermined signal state from the diagnostic equipment at the first set of contact pins and, when a predetermined signal state occurs, causes the switches to switch from the second stable position to the first stable position to connect the first set of contact pins to the communication bus, so that the diagnostic equipment connected to the diagnostic terminal may obtain direct access to the communication bus, the signal evaluation circuit including a detection device which, dependent on a specific voltage level within a predetermined voltage range applied on at least one of the first set of contact pins, will activate the switches and at least two comparators each comparing the voltage applied on at least one of the first set of contact pins with first and second reference voltages, respectively, which first and second reference voltages are obtained from a voltage divider.

4. A safety device according to claims 1, 2 or 3, wherein the diagnostic equipment includes signal circuits which apply a voltage within the predetermined voltage range to at least one of the first set of contact pins when the diagnostic equipment is connected to the diagnostic terminal.

5. A safety device for a diagnostic terminal for a distributed computer network containing at least two nodes and a common communication bus for the computer network, which diagnostic terminal includes a first set of contact pins for access to the communication bus and is connectable to an external diagnostic equipment for performing diagnostics on the nodes within the computer network, the safety device comprising:

switches which, in a first stable position, connect the first set of contact pins to the communication bus and, in a second stable position, disconnect the first set of contacts from the communication bus; and a signal evaluation circuit connected to the first set of contact pins and arranged to enable detection of a predetermined signal state from the diagnostic equipment at the first set of contact pins and, when a predetermined signal state occurs, causes the switches to switch from the second stable position to the first stable position to connect the first set of contact pins to the communication bus, so that the diagnostic equipment connected to the diagnostic terminal may obtain direct access to the communication bus, the diagnostic equipment applying the predetermined signal state to a second set of contact pins connected with said first set of contact pins when the diagnostic equipment is connected to the diagnostic terminal and the signal evaluation circuit including:

an interface capable of detection of at least one initiating message sent on the communication bus, which initiation message is compatible with a communication protocol used for messages sent on the communication bus but is unique in relation to any other type of message being sent on the communication bus;

a memory containing a unique authorization code for the computer network; and a comparison circuit for comparing the initiating message detected by the interface with the authorization code stored in the memory and, if a match occurs between the initiating message and the authorization code stored in the memory, establishes a direct access from the diagnostic terminal to the communication bus by switching the switches to the first stable position.

6. A safety device for a diagnostic terminal for a distributed computer network containing at least two nodes and a common communication bus for the computer network, which diagnostic terminal includes a first set of contact pins for access to the communication bus and is connectable to an external diagnostic equipment for performing diagnostics on the nodes within the computer network, the safety device comprising:

switches which, in a first stable position, connect the first set of contact pins to the communication bus and, in a second stable position, disconnect the first set of contacts from the communication bus; and a signal evaluation circuit connected to the first set of contact pins and arranged to enable detection of a predetermined signal state from the diagnostic equipment at the first set of contact pins and, when a predetermined signal state occurs, causes the switches to switch from the second stable position to the first stable position to connect the first set of contact pins to the communication bus, so that the diagnostic equipment connected to the diagnostic terminal may obtain direct access to the communication bus, the switches being relay contacts which are switched by a relay activated by the signal evaluation circuit and the signal evaluation circuit including:

an interface capable of detection of at least one initiating message sent on the communication bus, which initiation message is compatible with a communication protocol used for messages sent on the communication bus but is unique in relation to any other type of message being sent on the communication bus;

a memory containing a unique authorization code for the computer network; and a comparison circuit for comparing the initiating message detected by the interface with the authorization code stored in the memory and, if a match occurs between the initiating message and the authorization code stored in the memory, establishes a direct access from the diagnostic terminal to the communication bus by switching the switches to the first stable position.

7. A safety device for a diagnostic terminal for a distributed computer network containing at least two nodes and a common communication bus for the computer network, which diagnostic terminal includes a first set of contact pins for access to the communication bus and is connectable to an external diagnostic equipment for performing diagnostics on the nodes within the computer network, the safety device comprising:

semiconductor switches which, in a first stable position, connect the first set of contact pins to the communication bus and, in a second stable position, disconnect the first set of contacts from the communication bus; and a signal evaluation circuit connected to the first set of contact pins and arranged to enable detection of a predetermined signal state from the diagnostic equipment at the first set of contact pins and, when a predetermined signal state occurs, causes the switches to switch from the second stable position to the first stable position to connect the first set of contact pins to the communication bus, so that the diagnostic equipment connected to the diagnostic terminal may obtain direct access to the communication bus the signal evaluation circuit including:

an interface capable of detection of at least one initiating message sent on the communication bus, which initiation message is compatible with a communication protocol used for messages sent on the communication bus but is unique in relation to any other type of message being sent on the communication bus;

a memory containing a unique authorization code for the computer network; and a comparison circuit for comparing the initiating message detected by the interface with the authorization code stored in the memory and, if a match occurs between the initiating message and the authorization code stored in the memory, establishes a direct access from the diagnostic terminal to the communication bus by switching the switches to the first stable position.

8. A safety device according to claims 5, 6 or 7, wherein the memory is a non-volatile memory.

* * * * *